UNITED STATES PATENT OFFICE.

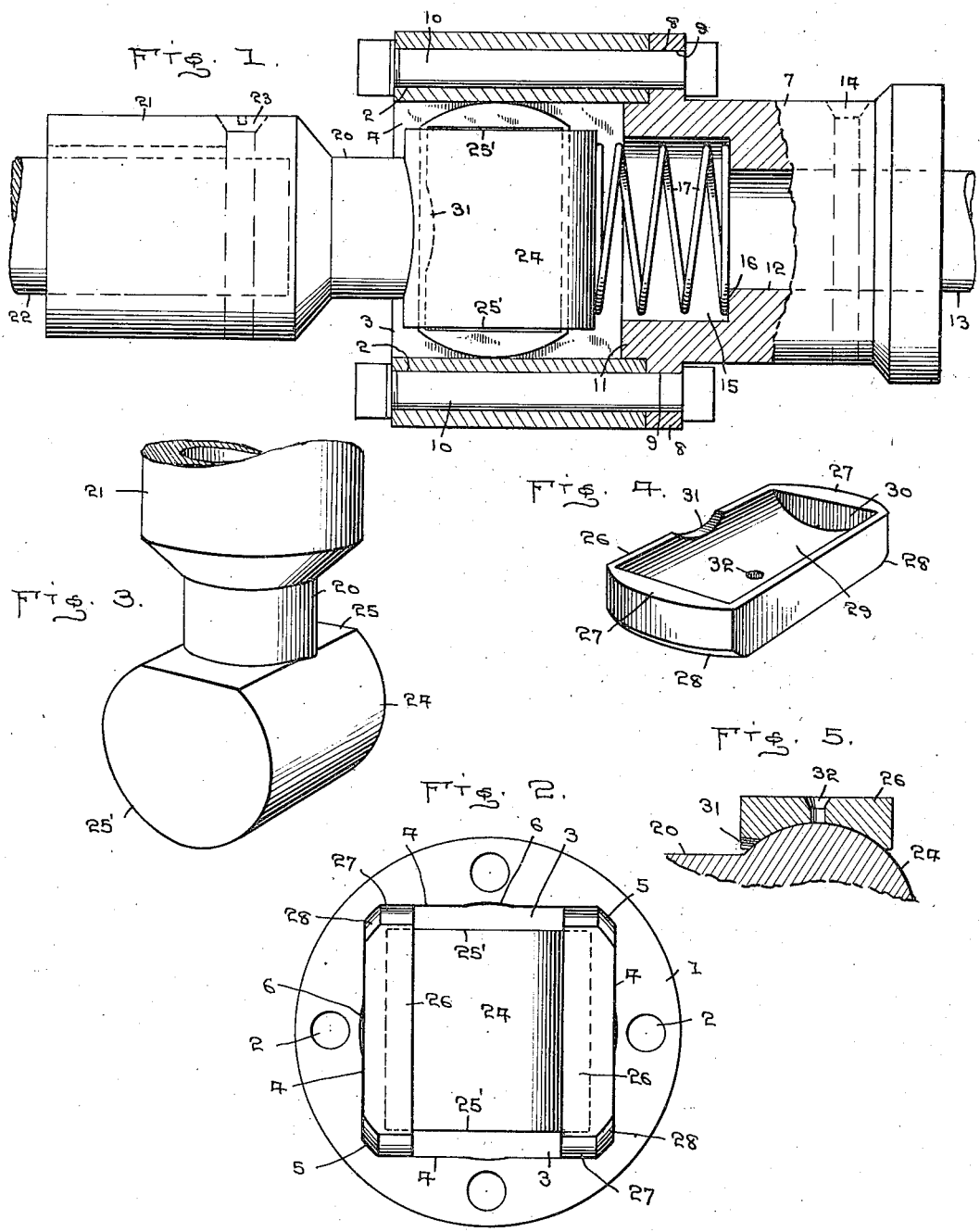

JAMES D. FETZER, OF COLUMBUS, OHIO.

UNIVERSAL JOINT.

1,128,431.   Specification of Letters Patent.   Patented Feb. 16, 1915.

Application filed February 6, 1914.   Serial No. 816,940.

*To all whom it may concern:*

Be it known that I, JAMES D. FETZER, a citizen of the United States, residing at Columbus, in the county of Franklin and State of Ohio, have invented certain new and useful Improvements in Universal Joints; and I do hereby declare the following to be a full, clear, and exact description of the invention, such as will enable others skilled in the art to which it appertains to make and use the same.

My invention relates to universal joints and more particularly to the combined universal and sliding type of joints.

One of the objects of this invention resides in the construction and arrangement of the parts for greatly increasing the area of the bearing surfaces thereof, thus prolonging the life and efficiency of the same and preventing the consequent lost motion due to wear.

Another object of this invention is to provide the parts with highly polished bearing surfaces for reducing the friction to a minimum, and the further provision of means for cushioning the sliding parts.

A further object of my invention resides in the construction and arrangement of the parts of the joint to provide for the greatest latitude of angular movements of the parts relative to each.

A still further object of this invention resides in the provision of multiple bearing surfaces for the sliding parts, wherein upon the excessive use of certain of the bearing surfaces, the sliding parts are designed to be transferred to other of the bearing surfaces. And a still further object of this invention also resides in the construction and assembling of the connecting parts for efficiently resisting the torque of the shafts to prevent rupture of the parts, as well as to provide for the ready disassembling of the parts for renewing the same, when necessary from excessive use. And still another object of my invention is the production of a universal and slidable joint which is simple in construction, efficient and durable in purpose and which can be manufactured and sold upon the market at a nominal cost.

These and other objects will more fully appear and the nature of the invention more clearly understood by the construction, combination and arrangement of the parts constituting the same, as described in the following specification, defined in the appended claims and illustrated in the accompanying drawings, in which, Figure 1 is a side view of my joint, partly in section, showing the interior construction thereof, Fig. 2 is an end view of the joint with one of the parts removed, looking from right to left of Fig. 1, showing the same as it appears in full lines. Fig. 3 is a perspective view of the shank and the head thereon of one of the parts of my joint, a portion of the same being shown in broken lines. Fig. 4 is a perspective view of one of the wearing blocks of the joint for engaging the head of the shank, and, Fig. 5 is a detail sectional view, showing the mounting of one of the wearing blocks upon the head of the shank.

Referring to the drawings, 1 denotes a box or housing cylindrical in form and being provided longitudinally thereof and adjacent the periphery with bores 2, to be hereinafter described. The box 1 is further provided with the rectangular bore 3 extending therethrough and surrounded by the walls 4, and at the junctures of the walls 4 is provided the angularly disposed portions 5 for relieving the angular bore 3 of any acute corners to thereby eliminate possibility of cramping as well as the friction occasioned by right angled corners. At a point within the walls 4, intermediate of the side edges and approximately at one of the ends of the same are circular cut out portions 6, hereinafter described.

Arranged at one end of the box 1 is the coupling member 7 provided at one of its ends with the annular flange 8, the flange being provided with the apertures 9 for registering with the bores 2 of the box 1 and secured thereto through the medium of the bolts 10. The union 7 is further provided with the approximately rectangular boss 11 of the contour of the bore 3 of the box 1, for snugly fitting within the same and designed to coact with the securing bolts 10 to provide a rigid and more efficient connection between the box 1 and the coupling member 7. Longitudinally through the central portion of the coupling member 7 is provided the bore 12, into which is seated the shaft 13, secured therein through the medium of the screw bolts, or any other suitable securing means 14. At the end of the coupling member 7, arranged within the box 1, is formed the circular recess 15 of a diameter greater than the bore 12 and arranged concentrically therewith, and providing the shoulders 16, against which one end of the compression spring 17 is seated, the spring being arranged within the recess 15. The function of the spring will be hereinafter described.

Arranged at the side of the box 1 and oppositely disposed relative to the coupling member 7, is the shank 20, also provided with the sleeve 21 and into which is mounted the shaft 22 and secured therein by the screw bolts 23, or any other suitable securing means. The shank 20 is further provided with the approximately cylindrical head 24, the head 24 being slightly flattened upon the portion adjacent the shank 20, as at 25, and the head 24 being further provided with the flat ends 25'. The head 24 is designed to be slidably mounted within the rectangular bore 3 of the box 1 and, arranged upon the circular portion of the head 24, are a pair of oppositely disposed wear blocks 26, interposed between the head 24 and two of the opposing walls 4 of the bore 3 within the box 1. The wear blocks 26 are preferably formed rectangular shape and elongated but having the ends 27 rounded and certain of the edges are inclined to conform with the inclined corners 5 of the bore 3 within the box 1, the ends 27 being designed to travel upon a portion of certain of the walls 4 and in position whereby the inclined edges 28 will engage the corners 5 of the bore 3. The wear blocks 26 are further provided with the recess 29, the bottom wall of which is concaved transversely of the wear blocks 26 and of a contour for snugly engaging the convex or rounded portion of the head 24, the end walls of the recess 29 being straight, as at 30, for overlapping the head, thus engaging the flat ends 25' thereof. The wear blocks 26 are each provided in one of their side edges, adjacent the shank 20, with the concave recess 31, as shown in Figs. 1 and 5, and also extending through the bottom of the concave recess 29 is the aperture 32 provided for lubricating the working parts.

The operation and the arrangement of the parts constituting my invention will become more apparent from the following: The head 24 of the shank 20 is mounted in the bore 3 within the box 1 and interposed between the head 24 and two of the walls 4 opposite each other, are the wear blocks 26, the concave portion 29 embracing a portion of the convex face of the head 24 and having the flat sides of the blocks 26 bearing against the opposed walls 4, the rounded ends 27 engaging the other pair of oppositely disposed walls adjacent the junctures of the walls, the beveled or inclined edges 28 of the blocks 26 engaging the portions 5 arranged within the bore 3, that portion of the convex face of the head 24 between the ends of the wear blocks engages the opposite end of the compression spring 17, arranged within the recess 15 of the coupling member 7, the spring 17 providing cushioning means for the working parts and at the same time having a tendency to normally hold the head 24 slightly removed from the rectangular boss 11, arranged within one end of the box 1, and by the provision of the concave recesses 6 of the box 1 and the concave recesses 31 of the wear blocks 32, the shank 20 can attain a greater latitude of movement relative to the box 1. It is, therefore, clearly obvious that should the opposing walls 4 become worn by the excessive use of the device, that the same may be readily withdrawn and slightly rotated in order that the faces of the blocks 21 may engage the oppositely disposed intervening walls 4, which walls have not been subjected to previous wear in the course of the use of the joint. I desire to also state that in the course of manufacture of the joints, the surfaces are thoroughly ground and highly polished for preventing all danger of friction at the initial working of the same, whereby the head 24 and the wear blocks 26 are free to slide within the bore 3 of the box 1 during one direction of movement, and the head 24 capable of readily and partially rotating within the concave recesses of the wearing blocks, and it is therefore readily seen that, as all of the surfaces are polished, there is little or no wear due to friction. I have at the same time, through the medium of the rectangular boss 11 seated within the rectangular bore 3 of the box 1 in conjunction with the retaining bolts 10, provided a most efficient connection for resisting the torque of the shafts to which the same is connected.

While I have here shown and described the preferred form of my invention, I hereby reserve the right to make such variations and alterations therein as I may deem expedient from time to time and which will not depart from the spirit of the invention or conflict with the scope of the appended claims.

What I claim is:

1. A universal joint comprising; a boxing member having a substantially rectangular bore therethrough and with a plurality of apertures through the walls of said boxing member, a coupling member having an annular flange thereto with a plurality of apertures therethrough to register with the apertures in said box member, fastening means mounted through said apertures and connecting said coupling member with said boxing member, a shank having a cylindrical head with flat ends mounted within said bore and spaced therefrom, a spring mounted between said head and said coupling member to space said head from said coupling member, and two oppositely disposed bearing members mounted between said head and said bore to space said head from the sides of said bore, the ends of said bearing members adapted to retain the end of said spring from slipping off of the head of said shank, said device allowing of longitudinal play without torsion.

2. A universal joint comprising; a rectangular boxing member having apertures through the walls thereof, a shank member having a cylindrical head with flat ends mounted to slide within said boxing member, a coupling member having a shaft bore therein, an enlarged spring seating chamber adapted to partially penetrate said boxing member, and an annular flange projecting from the outer walls of said coupling member having apertures therethrough registering with the apertures in the walls of said boxing member, said flange restricting the degree of penetration of said coupling member into said boxing member, means mounted through said registering apertures to couple said coupling member through the medium of said flange to said boxing member, a spring mounted in said chamber to space the shank head from said coupling member, and bearing members mounted between said shank head and the walls of said boxing member to space said shank head from said boxing member, the ends of said bearing members adapted to retain the end of said spring in position upon said shank head, said device allowing of universal movement without torsion.

In testimony whereof I have signed my name to this specification in the presence of two subscribing witnesses.

JAMES D. FETZER.

Witnesses:
B. F. MARTZ,
W. F. RICHMOND.